No. 691,402. Patented Jan. 21, 1902.
A. MÉSZÁROS.
METHOD OF PRESERVING ORGANIC SUBSTANCES.
(Application filed Sept. 28, 1901.)
(No Model.)
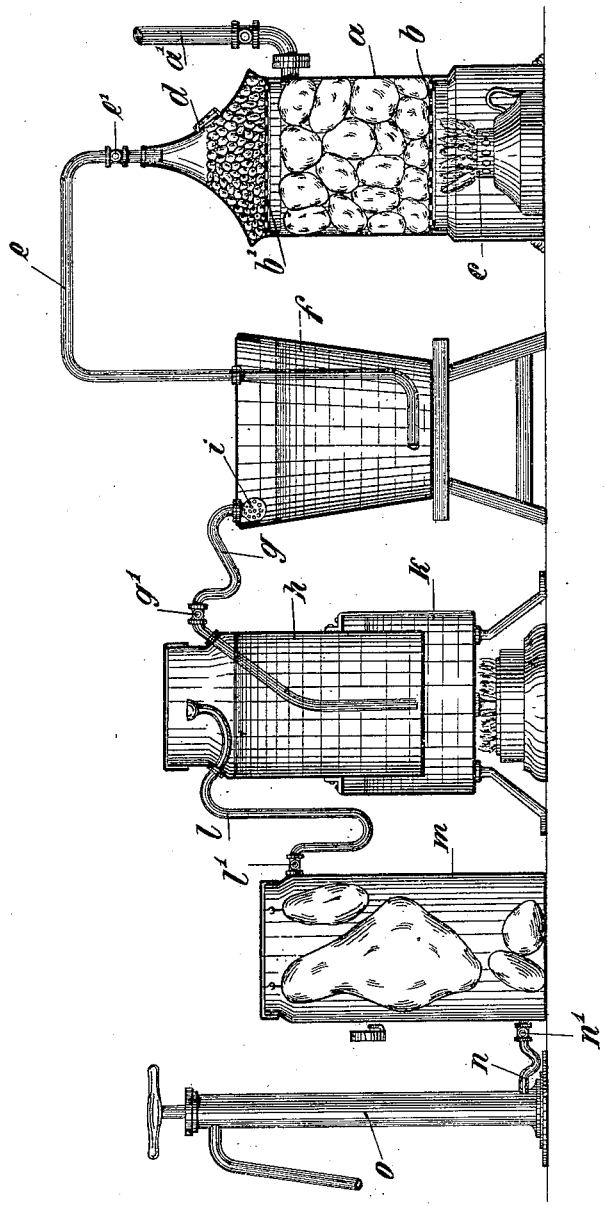
Witnesses:
G S Noble
Jacob Heller.
Inventor,
Alexander Mészáros
by B Singer
Att'y.

UNITED STATES PATENT OFFICE.

ALEXANDER MÉSZÁROS, OF SZÉKESFEJÉRVÁR, AUSTRIA-HUNGARY.

METHOD OF PRESERVING ORGANIC SUBSTANCES.

SPECIFICATION forming part of Letters Patent No. 691,402, dated January 21, 1902.

Application filed September 28, 1901. Serial No. 55,974. (No specimens.)

*To all whom it may concern:*

Be it known that I, ALEXANDER MÉSZÁROS, a subject of the Emperor of Austria-Hungary, residing at Székesfejérvár, in the Empire of Austria-Hungary, have invented a certain new and useful Method of Preserving Organic Substances, (for which I have applied for a patent in Hungary, Germany, England, and France,) of which the following is a specification.

The present invention relates to a method or process of preserving organic bodies, such as meat, fruit, eggs, vegetables, carcasses, corpses, and the like.

The process consists principally in the fact that the materials are subjected in closed receptacles to the action of the dry products of dry distillation of onions, which products are passed through salt water and alcohol before reaching the body to be preserved. Organic bodies submitted to such vapors retain their color and other qualities and will not decompose.

The preserved materials can be exposed to the air without undergoing any detrimental changes.

A suitable form of apparatus for carrying out the method is represented in the annexed drawing.

The receptacle $a$, in which the dry distillation of the onions takes place, is funnel-shaped at its upper part, and the chamber formed between the gratings $b$ and $b'$ thereof is filled with charcoal. Below the grating $b$ is a suitable source of heat $c$, which keeps the charcoal constantly glowing. The upper funnel-shaped part is removable and provided with an opening $d$, through which the onions in small chips or pieces are passed onto the red-hot grating $b'$. The dry products of distillation thus obtained pass through the pipe $e$ into the lower part of a hermetically-closed receptacle $f$, which is filled with salt water to about four-fifths of its capacity. The salt water consists of a saturated solution of common salt, which has previously been boiled and is then kept at the normal temperature of 12° to 16° Celsius in order to cool the said products of distillation arriving from the receptacle $a$. From the upper part of this receptacle $f$ the pipe $g$ passes into the adjacent receptacle $h$, which is filled with alcohol of 96° to 97° to about three-fourths of its height. The end of the pipe $g$ in the receptacle $f$ is provided with a rose $i$ in order to prevent the salt water from being forced from the receptacle $f$ with the vapors passing out through the pipe. The receptacle $h$ is arranged in a tank $k$ containing water which is kept at such a temperature that the alcohol quickly evaporates. From the upper part of the receptacle $h$ a pipe $l$ passes into the chamber $m$, containing the materials to be preserved, said chamber being adapted to be tightly closed. From the receptacle $m$ on the side opposite to where the pipe $l$ enters a pipe $n$ communicates with a suitable pump or ventilator. Each of the connection-pipes $e$, $g$, $l$, and $n$ is provided with a cock $e'$ $g'$ $l'$ $n'$, respectively. The communication between the adjacent receptacle or between the pump and the receptacles can be interrupted as desired by closing the proper cocks.

For carrying out the process the separate parts of the apparatus may of course be of any suitable shape and arranged in convenient groups.

The process is carried on as follows: By closing the cock $l'$ the receptacle $m$ and pump $o$ are shut off from the other parts of the apparatus, and a portion of the air contained in said receptacle is withdrawn by the use of the pump. The receptacle $m$ should be washed out with alcohol before commencing the operations. The cock $n'$ is then closed, and on opening the cock $l'$ the receptacle $m$ is placed in communication with the other parts of the apparatus, so that the air previously pumped out from the receptacle $m$ is replaced by fresh air. At the same time as this operation takes place the grating $b'$ is brought to red heat as follows: The chimney $a'$, which is arranged to open into the vessel $a$ below the grating $b'$ and has its outer end open to the air, is brought into connection with the interior of the receptacle by opening the cock therein, while the said receptacle is placed out of communication with the other parts of the apparatus by closing the cock $e'$. The source of heat $c$, arranged below the grating $b$, is then lighted, so that by reason of the draft in the chimney $a'$ the charcoal between the two gratings, as well as the upper grating $b'$, are brought to red heat. Then the draft through the chimney $a'$ is shut off from the receptacle a by closing its cock, and the said receptacle a is brought into communication with the other parts of the apparatus by opening the cock e'. The fresh air passing into the receiver m consequently passes through the heated grating b' and through the separate parts of the apparatus. The real preserving process now takes place. The onions, cut into small pieces, are placed on the grating b' through the opening d, which is then closed, while the cock n' is opened and the pump o operated. By the action of the pump o a current of air and steam is produced, which passes through the whole apparatus. The air which passes through the gratings of the receptacle a and through the layers of glowing charcoal between the said gratings forces the dry products of distillation of the onions with it through the pipe e into the lower part of the salt solution in the receptacle f. The gases and vapors, together with some salt steam, rise through the rose i and pipe g into the alcohol-receiver h, from whence they pass, mixed with alcoholic vapors, through the pipe i into the receptacle m, in which they exercise a preserving influence on the materials to be preserved, and finally pass into the air through the pipe n and pump o. According to the materials to be preserved, this process is continued for a longer or shorter time, and when it is completed the receptacle m is disconnected from the rest of the apparatus by closing the cocks l' and m' and disconnecting the pipes l and n, whereupon another receptacle filled with materials to be preserved can be substituted.

By the term "onions" used in this specification I intend to include any suitable variety of that vegetable family, including, for instance, garlic, as well as that class commonly termed "onions."

The preservation can take place simultaneously in several receptacles, in which case the said receptacles are inserted between the receptacle h and pump o either behind or above each other.

The nature of the process does not undergo any change when the products of distillation of the onions are first brought together with the alcoholic vapors in the receptacle containing the materials to be preserved, in which case the alcohol-receiver can be omitted. The apparatus is then used in such a manner that an open vessel filled with alcohol is put into the preserving-receptacle, so that the alcoholic vapors are mixed with the products of distillation, thus exercising the preserving influence on the materials.

Materials treated by this method—such as meat, eggs, fruit, vegetables, and the like—can be taken out of the apparatus and exposed to air without being spoiled.

What I claim, and desire to secure by Letters Patent, is—

1. A method of preserving organic bodies consisting in exposing the latter to the influence of the products of dry distillation of onions and alcoholic and salt vapors.

2. The herein-described method of preserving organic bodies which consists in placing the material to be preserved in a receptacle, forcing the products of dry distillation of onions through a salt solution and body of alcohol, and then passing such products through said receptacle.

3. The herein-described method of preserving organic bodies which consists in exposing the material to be preserved to the combined action of the products of dry distillation of onions and alcoholic vapor.

In testimony whereof I have hereunto set my hand in the presence of two witnesses.

ALEXANDER MÉSZÁROS.

Witnesses:
JOSEPH WIEKMANN,
ODÖN MOHUAI.